3,415,777
POLYMERIZATION OF CYCLIC ORGANOSILOX-
ANES EMPLOYING AN ACTIVATED ZINC
CHALCOGEN CATALYST
Edgar E. Bostick, Scotia, N.Y., assignor to General Electric Company, a corporation of New York
No Drawing. Filed Mar. 17, 1967, Ser. No. 623,812
6 Claims. (Cl. 260—46.5)

ABSTRACT OF THE DISCLOSURE

This disclosure is concerned with a process for the polymerization of certain organocyclotrisiloxanes by heat in the presence of a specially activated zinc chalcogen catalyst.

This disclosure is also concerned with a zinc chalcogen which is coated with certain specific linear organopolysiloxanes according to the disclosed process. These coated zinc chalcogens are useful as fillers for elastomers, as the light source in electroluminescent devices and as a charge carrier in electrostatic printing devices.

---

Heretofore, it has been known to polymerize cyclic diorganosiloxanes to yield linear diorganosiloxanes which were useful in the preparation of organopolysiloxane elastomers by the polymerization of these cyclic siloxanes by means of an alkaline catalyst such as potassium hydroxide, rubidium hydroxide, or cesium hydroxide and their respective silanolates, as well as with acid catalysts such as ferric chloride and sulfuric acid. These prior art processes suffer the disadvantage in that the polymerization is an equilibrium reaction and the alkaline or acid catalyst causes the polymerization of the cyclic diorganopolysiloxane to yield linear diorganopolysiloxanes and also causes depolymerization of the linear diorganopolysiloxanes to yield cyclic diorganopolysiloxanes.

It is an object of this invention to polymerize certain cyclotrisiloxanes employing an activated zinc chalcogen catalyst by heating at an elevated temperature. The process of this invention is a direct polymerization process and does not result in the depolymerization of the linear organopolysiloxanes produced to yield cyclic siloxanes.

It is a further object of this invention to produce linear organopolysiloxanes of extremely high molecular weight which are not readily produced in accordance with the prior art processes.

The other objects of this invention will become more apparent from the following description.

In accordance with the process of the instant invention, a cyclotrisiloxane selected from the class consisting of hexaorganocyclotrisiloxanes of the formula (I) 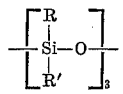

wherein R is a methyl group and R' is a methyl or phenyl group, a cyclic trisiloxane of the formula (II) 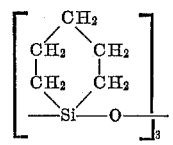

and mixtures of cyclic trisiloxanes of Formula I and II, or mixtures of cyclic trisiloxanes of Formula I and/or II with hexaphenylcyclotrisiloxane, is placed in contact with an activated zinc chalcogen and the mixture heated to a temperature of from 50° C. to 250° C. or higher, whereby the cyclic trisiloxane is polymerized to a linear organopolysiloxane. The zinc chalcogens which are employed as catalysts in the process of this invention include zinc oxide, zinc sulfide, zinc telluride, and zinc selenide, which have been activated by heating to elevated temperatures. The general procedure for the activation of the zinc chalcogen is to place the zinc chalcogen in a reaction vessel and heat the zinc chalcogen to a temperature of from 200° C. to 550° C. at pressures ranging from 760 millimeters of mercury to $10^{-6}$ millimeters of mercury. The zinc chalcogens heated in this manner have been found to be extremely active catalysts for the polymerization of the aforementioned cyclic trisiloxanes in the manner indicated.

The zinc chalcogens used in the process of this invention may be produced in accordance with well known procedures. For example, zinc oxide may be formed in situ by the decomposition of a number of zinc salts such as the carbonate, formate, oxalate, etc. Zinc oxide derived from the carbonate is a particularly reactive form. Furthermore, in the process of this invention, the zinc compound may be deposited on a different substrate such as silica and decomposed in situ so as to form a more efficient substrate for the subsequent polymerization.

The process of the present invention is generally conducted in the absence of a solvent to produce the high molecular weight linear organopolysiloxanes. A solvent can be employed to recover the polymer produced; for example, the polymer produced can be dissolved in an aromatic solvent such as benzene, toluene, xylene, etc., and the polymer then precipitated by adding this solution to methanol and the polymer recovered by filtration.

It has been found that the linear organopolysiloxanes produced in accordance with the process of this invention have very high molecular weights as determined by their intrinsic viscosity. In some instances, the intrinsic viscosities of the polymer in benzene at 25° are as high as 25 to 35 deciliters per gram; such high intrinsic viscosities are entirely unexpected in view of the prior art. It has also been found that the process of the instant invention causes the polymerization of the aforementioned cyclic trisiloxane and does not cause a rearrangement of the cyclic trisiloxanes to other cyclic siloxanes nor does the process cause the depolymerization of the polymer to yield cyclic siloxanes.

The amount of the activated zinc chalcogen catalyst employed in the process of this invention can vary over wide ranges. The amount of the activated zinc chalcogen can be from 0.1 part, by weight, to 1600 parts, by weight, or higher per 100 parts, by weight, of the cyclic trisiloxane. It has been found that the zinc chalcogen to cyclic trisiloxane ratio is directly proportional to the yield obtained. For example, when one increases the zinc chalcogen to cyclotrisiloxane ratio, the yield of the polymer produced increases. It has been unexpectedly found that the molecular weight also increases with increasing zinc chalcogen to cyclotrisiloxane ratio.

In producing the high molecular weight organopolysiloxanes in accordance with the process of this invention, one also produces a zinc chalcogen which is coated with said high molecular weight organopolysiloxanes. It is of course apparent that the higher the zinc chalcogen to cyclotrisiloxane ratio, the greater the amount of the coated zinc chalcogen which will be produced. These coated zinc chalcogens are useful as hydrophobic fillers for silicone elastomers, etc. The coated zinc sulfides are useful in producing electroluminescent photoconductive devices by known processes. The coated zinc oxides also find use in electrostatic printing processes in that such coatings reduce the susceptibility of the zinc oxide charge carrier to conditions where high amounts of water vapor are encountered.

The linear organopolysiloxanes produced in accordance with process of this invention can be milled with fillers such as fumed silicas, aluminum oxides, precipitated silicas, carbon black, etc., and with peroxides such as dibenzoyl peroxide, tertiary butyl peracetate, 2,4-dichlorobenzoyl peroxide, dicumyl peroxide, etc., and heat-cured to yield elastomers which have a variety of uses such as gaskets, rubber tubings, etc.

The following examples serve to further illustrate the invention. All parts are by weight unless otherwise stated.

EXAMPLE 1

A heavy-wall Pyrex ampoule was fitted with a 14/35 standard taper female joint and sidearm. Zinc oxide (2 grams) was charged into this ampoule. A ½" diameter ampoule with a break seal containing 2 grams of recrystallized trans-2,4,6-trimethyl-2,4,6-triphenylcyclotri-siloxane (M.P. 45° C.) was sealed to the sidearm. The system was evacuated and a furnace operating at 500° C. was placed around the Pyrex ampoule. The ampoule containing the zinc oxide was heated at approximately 500° C. for 16 hours at a pressure of $10^{-6}$ mm. of mercury. The system was cooled, isolated and the cyclic siloxane added by breaking the seal and melting the siloxane to allow it to flow into the zinc oxide. The tube containing the zinc oxide and cyclic trisiloxane was sealed off and placed in a 175° C. oven for two hours. The tube was then removed, cooled, opened and filled with benzene to dissolve the benzene soluble polymer. There was isolated a benzene soluble polymer and a polymer which was insoluble in benzene but soluble in hot dibutyl ether of diethylene glycol.

The benzene-soluble polymer had an intrinsic viscosity of 15 dl./gram in benzene at 25° C.

EXAMPLE 2

In this example the procedure of Example 1 was followed except that the zinc oxide was heated at a temperature of 400° C. The reaction mixture was then placed in the 175° C. oven as before for two hours and the polymer was then worked up in boiling xylene. The xylene-soluble polymer was found to have an intrinsic viscosity in benzene of approximately 11 dl./gram at 25° C. The polymer was a tough, elastic polysiloxane which was stable for some time on a hotplate at 300° C.

EXAMPLE 3

Hexaphenylcyclotrisiloxane (5 grams) and trans-2,4,6-trimethyl-2,4,6-triphenylcyclotrisiloxane (5 grams) were dissolved in benzene and the benzene solution intimately mixed with 10 grams of activated zinc oxide. The zinc oxide had been activated by heating to 500° C. for 15 hours at $10^{-6}$ millimeters of mercury. The benzene was flash-distilled and the resulting reaction mixture was heated to 225° C. for 6 hours. The reaction mixture was worked up by dissolution in benzene, filtration to remove zinc oxide and precipitation of the polymer by adding the benzene solution to methanol. The yield was 4 grams of a tough, white elastomeric methylphenylpolysiloxane copolymer having an intrinsic viscosity of 6.90 deciliters/gram in benzene at 25° C.

EXAMPLE 4

A series of runs were made to show the effect of changes in the zinc oxide to cyclotrisiloxane ratio on the polymerization system.

Pyrex ampoules were sealed to a common manifold and were charged with zinc oxide in the amounts indicated in the table. The manifold was evacuated to $10^{-6}$ mm. of mercury and heated to 500° C. for 18 hours. The ampoules were cooled to room temperature and charged with 2 grams each of trans-2,4,6-trimethyl-2,4,6-triphenylcyclotrisiloxane. The ampoules were removed by sealing off under vacuum and heated to 175° C. for 22 hours. Each ampoule was then cooled, opened and worked up by dissolution of the polymer in benzene, filtration to remove zinc oxide, drying and extraction of the residual starting cyclotrisiloxanes with alcohol. The results are given in the following table.

TABLE I

| Run | ZnO, grams | ZnO to siloxane weight ratio | Percent conversion | [n] Dl./gm. |
|---|---|---|---|---|
| A | 4 | 2/1 | 26.35 | 1.87 |
| B | 8 | 4/1 | 39.15 | 3.08 |
| C | 16 | 8/1 | 56.30 | 6.05 |

The products were snappy, tough elastomers which could be processed by conventional means and crosslinked to give useful high temperature rubbers.

EXAMPLE 5

A doped zinc sulfide phosphor (4 grams) was placed in a 100 ml. reaction bulb attached to a ½" Pyrex column with a calcium hydride packing and a vacuum connection. An ampoule containing 2 grams of cis-2,4,6-trimethyl-2,4,6-triphenylcyclotrisiloxane dissolved in 50 ml. of benzene was sealed to the top of a calcium hydride column. A vacuum was drawn on the system and the calcium hydride column was flamed with a bushy flame until gas evolution had diminished. An oven operating at 250° C. was then raised into position around the bulb containing the zinc sulfide.

The zinc sulfide was heated at 250° C. at $10^{-6}$ millimeters of mercury pressure for 18 hours. The bulb and contents were then cooled to room temperature under vacuum and a benzene solution of cis-2,4,6-trimethyl-2,4,6-triphenylcyclotrisiloxane was transferred through the packing (calcium hydride) to the zinc sulfide where it was used to slurry the zinc sulfide by gentle shaking. The benzene was removed by flash-distilling to an adjacent bulb on the vacuum manifold. During the benzene distillation, the viscosity of the system increased at a relatively fast rate, indicating polymerization. The benzene was then pumped away and the flask removed. The unreacted cyclosiloxane was then extracted with n-hexane and the polymer-coated particles collected on a filter.

The resulting powders are relatively free-flowing and exhibit water-repellent properties, as indicated by their floating on water for 8 days, while the untreated particles became wet and sank immediately upon contact with water. Electroluminescent photoconductive devices were fabricated from the coated particles.

EXAMPLE 6

Example 5 was repeated employing 8 grams of the zinc sulfide phosphor instead of 4 grams as in Example 5. The powder isolated was found to be free-flowing and water-repellent as in Example 5. The cyclics recovered by the hexane extraction were found to be unchanged cis-2,4,6-trimethyl-2,4,6 - triphenylcyclotrisiloxane which indicates that the polymerization takes place without equilibration.

EXAMPLE 7

Zinc oxide (2 grams) and trans-2,4,6-trimethyl-2,4,6-triphenylcyclotrisiloxane (2 grams) were thoroughly admixed in a 125 ml. Erlenmeyer flask and the mixture was heated at 175° C. for 24 hours. At the end of this time the reaction product was worked up by the addition of benzene to dissolve the product. The benzene solution was filtered, and then evaporated to dryness and then extracted with ethanol. The resultant product was found to be a very low molecular weight, oily material.

In another flask zinc oxide (23 grams) was placed and baked with slight pumping for 16 hours at 500° C. The zinc oxide was cooled and trans-2,4,6-trimethyl-2,4,6-triphenylcyclotrisiloxane (23 grams) was added by melting and thoroughly mixing in the melt. The mixture was then heated for 2 hours at 175° C., cooled, and worked up by dissolving the polymer in benzene, filtering to remove the ZnO, and precipitating the resulting polymer solution in cold methanol. Yield was 11.5 grams of very high molecular weight tough elastomer. A portion of the polymer was then mixed with silica and benzoyl peroxide as follows:

| | Parts |
|---|---|
| Polymer | 100 |
| Precipitated silica | 50 |
| Benzoyl peroxide | 2½ |

Mixing was on a 2 inch mill until thorough dispersion was achieved. The mixture was allowed to age overnight, was then freshened, and pressed in a closed mold for 10 minutes at 150° C. at 5000 p.s.i. and further heated for 3 hours at 200° C. in an oven. The resulting elastomer was found to have a tensile strength at room temperature of 1390–1500 pounds/square inch, 242% elongation, and a tensile strength at 125° C. of 741 pounds/square inch and 172% elongation.

EXAMPLE 8

Cis-2,4,6-trimethyl - 2,4,6 - triphenylcyclotrisiloxane (2 grams) was co-dissolved in 25 ml. of benzene with hexaphenylcyclotrisiloxane (2 grams). The resulting solution was then thoroughly mixed with zinc oxide (4 grams, which had been activated by baking at 500° C. for 18 hours at $10^{-5}$ ml. mercury pressure). The benzene was removed by flash evaporation to a vacuum line and the resulting mixture was heated to 200° C. for 2 hours. The reaction vessel was then cooled, opened and treated with 100 ml. of benzene containing a few drops of glacial acetic acid. The dissolved polymer was filtered away from zinc oxide, precipitated in methanol and dried. The product was a copolymer containing methylphenylsiloxane units and diphenylsiloxane units and was a tough, white elastomer.

It will, of course, be apparent to those skilled in the art that modifications other than those set forth in the above examples can be employed in the process of this invention without departing from the scope thereof.

What is claimed is:

1. A process for the polymerization of cyclic trisiloxanes to yield linear organopolysiloxanes which comprises contacting a cyclotrisiloxane selected from the class consisting of hexamethylcyclotrisiloxane, 2,4,6 - trimethyl- 2,4,6-triphenylcyclotrisiloxane, a cyclotrisiloxane of the formula,

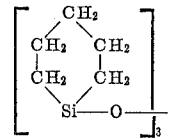

mixtures thereof, and mixtures thereof with hexaphenylcyclotrisiloxane, with a heat activated zinc chalcogen catalyst, said zinc chalcogen having been activated by heating to a temperature of from 200° C. to 550° C. at pressures of from $10^{-6}$ to 760 millimeters of mercury, and heating the resultant mixture to a temperature of from about 50° C. to about 250° C. whereby said cyclotrisiloxane polymerizes to yield said linear organopolysiloxanes.

2. The process as in claim 1 wherein the cyclotrisiloxane is cis-2,4,6-trimethyl-2,4,6-triphenylcyclotrisiloxane.

3. The process as in claim 1 wherein said cyclotrisiloxane is trans - 2,4,6 - trimethyl-2,4,6-triphenylcyclotrisiloxane.

4. The process as in claim 1 wherein said cyclotrisiloxane is a mixture of trans-2,4,6-trimethyl-2,4,6-triphenylcyclotrisiloxane and hexaphenylcyclotrisiloxane.

5. The process as in claim 1 wherein the weight amount of the zinc chalcogen is from 1 to 1000 parts of the zinc chalcogen per 100 parts of the cyclotrisiloxane.

6. A zinc chalcogen coated with a linear organopolysiloxane in accordance with the process of claim 1.

References Cited

UNITED STATES PATENTS

| 3,294,740 | 12/1966 | McVannel | 260—46.5 |
| 3,305,524 | 2/1967 | Brown et al. | 260—46.5 |

FOREIGN PATENTS

| 957,255 | 5/1964 | Great Britain. |

DONALD E. CZAJA, *Primary Examiner.*

M. T. MARQUIS, *Assistant Examiner.*

U.S. Cl. X.R.

260—37; 117—161,169; 260—448.2